(12) United States Patent
Wing

(10) Patent No.: US 12,390,801 B2
(45) Date of Patent: Aug. 19, 2025

(54) WRAPPED GREEN BODY CARRIER

(71) Applicant: CORNING INCORPORATED, Corning, NY (US)

(72) Inventor: Douglas Richard Wing, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 750 days.

(21) Appl. No.: 17/734,468

(22) Filed: May 2, 2022

(65) Prior Publication Data

US 2022/0362755 A1  Nov. 17, 2022

Related U.S. Application Data

(60) Provisional application No. 63/187,060, filed on May 11, 2021.

(51) Int. Cl.
 *B01J 35/00* (2024.01)
 *B01D 46/24* (2006.01)
 (Continued)

(52) U.S. Cl.
 CPC ............ *B01J 35/19* (2024.01); *F27D 5/0031* (2013.01); *F27D 5/0056* (2013.01);
 (Continued)

(58) Field of Classification Search
 CPC ......... B01J 35/19; B01J 35/56; F27D 5/0031; F27D 5/0056; F27D 2005/0093;
 (Continued)

(56) References Cited

U.S. PATENT DOCUMENTS

| | | | | |
|---|---|---|---|---|
| 4,359,828 A | * | 11/1982 | Thomas | D21F 5/042 34/116 |
| 5,575,082 A | * | 11/1996 | Kishi | E03D 11/11 34/247 |

(Continued)

FOREIGN PATENT DOCUMENTS

| | | | |
|---|---|---|---|
| CA | 2921689 A1 | * | 9/2017 |
| EP | 2937653 B1 | | 12/2018 |

(Continued)

*Primary Examiner* — Stephen M Gravini
(74) *Attorney, Agent, or Firm* — Kevin M. Able

(57) ABSTRACT

According to certain aspects, a wrapped green body carrier for a green body includes side supports and moveable supports mounted to the side supports. Each of the moveable supports includes an inner end configured to move relative to the side supports. The green body carrier includes a flexible sheet attached to and suspended from each inner end of the moveable supports. The inner ends of the moveable supports are configured to move inward to wrap the flexible sheet around at least a portion of the green body (e.g., more than 180°). Accordingly, the wrapped green body carrier supports a large circumference of the green body and accommodates large deviations in shape and/or diameter. In certain embodiments, the flexible sheet includes radiation coupling material or radiation blocking material so that wrapping the flexible sheet around the green body improves uniformity during microwave drying.

19 Claims, 12 Drawing Sheets

(51) Int. Cl.
  *B01D 53/94* (2006.01)
  *F27D 5/00* (2006.01)
  *H05B 6/64* (2006.01)

(52) U.S. Cl.
  CPC ....... *H05B 6/6408* (2013.01); *B01D 46/2418* (2013.01); *B01D 53/94* (2013.01); *B01D 2255/9155* (2013.01); *B01D 2279/30* (2013.01); *F27D 2005/0093* (2013.01); *H05B 2206/046* (2013.01)

(58) Field of Classification Search
  CPC ............ H05B 6/6408; H05B 2206/046; B01D 46/2418; B01D 53/94; B01D 2255/9155; B01D 2279/30
  USPC .......................................................... 34/259
  See application file for complete search history.

(56) References Cited

U.S. PATENT DOCUMENTS

| | | | | |
|---|---|---|---|---|
| 5,852,879 | A * | 12/1998 | Schumaier | F26B 9/003 34/80 |
| 6,280,573 | B1 * | 8/2001 | Lindsay | D21F 3/0272 162/263 |
| 6,701,637 | B2 * | 3/2004 | Lindsay | D21F 5/004 162/207 |
| 6,887,343 | B2 * | 5/2005 | Schukar | B01D 46/24 210/493.4 |
| 8,640,360 | B2 * | 2/2014 | Stamm | F04D 25/08 702/182 |
| 11,032,879 | B2 * | 6/2021 | Kimrey, Jr | H05B 6/6408 |
| 11,143,454 | B2 * | 10/2021 | Triglia, Jr. | F26B 3/347 |
| 11,471,551 | B1 * | 10/2022 | Leavitt | B01D 46/0028 |
| 12,214,511 | B2 * | 2/2025 | Duroe | B28B 11/248 |
| 12,246,266 | B2 * | 3/2025 | Andrews | F26B 25/007 |
| 2013/0221578 | A1 | 8/2013 | Feldman et al. | |
| 2015/0273727 | A1 | 10/2015 | Noni et al. | |
| 2018/0334328 | A1 | 11/2018 | Duroe | |
| 2019/0248593 | A1 | 8/2019 | Hayakawa et al. | |
| 2022/0362755 | A1 * | 11/2022 | Wing | F27D 5/0056 |

FOREIGN PATENT DOCUMENTS

| | | | | |
|---|---|---|---|---|
| WO | WO-2004060521 | A2 * | 7/2004 | ......... B01D 29/012 |
| WO | WO-2021108234 | A2 * | 6/2021 | ............. B25J 13/08 |

* cited by examiner

WRAPPED GREEN BODY CARRIER

CROSS REFERENCE TO RELATED APPLICATION

This application claims the benefit of priority under 35 U.S.C. § 119 of U.S. Provisional Application Ser. No. 63/187,060 filed on May 11, 2022, the content of which is relied upon and incorporated herein by reference in its entirety.

BACKGROUND

The disclosure relates to ceramic article production, and more particularly, to a wrapped green body carrier for a green body.

Ceramic honeycomb bodies are used in a wide variety of applications, such as the treatment or pollutant abatement of fluid streams. For example, porous ceramic honeycomb bodies can be arranged as substrates for catalytic converters or particulate filters in the after-treatment of engine exhaust. The process for manufacturing ceramic bodies may include shaping of a ceramic-forming batch mixture into a desired shape and dimensions, such as via extrusion, as well as subsequent manufacturing steps such as cutting, drying, inspecting, and/or firing the green bodies, which requires handling, transport, and/or conveyance of the green bodies.

SUMMARY

Aspects of the present disclosure permit green bodies to be supported by a flexible sheet. A wrapped green body carrier for green bodies according to certain aspects includes side supports, and at least one moveable support mounted to the side supports. Each of the moveable supports includes an inner end configured to move relative to the side supports. The green body carrier includes a flexible sheet attached to and suspended from each inner end of the moveable supports. The inner ends of the moveable supports are configured to move inward to wrap the flexible sheet around at least a portion of the green body (e.g., more than 180°). Accordingly, the wrapped green body carrier supports a large circumference of the green body and accommodates large deviations in shape and/or diameter. In certain embodiments, the flexible sheet includes radiation coupling material or radiation blocking material so that wrapping the flexible sheet around the green body improves uniformity during microwave drying.

In one aspect, the present disclosure relates to a green body carrier. The green body carrier includes at least one first side support and at least one second side support positioned opposite the at least one first side support. The green body carrier includes at least one first moveable support mounted to the at least one first side support. Each of the at least one first moveable supports includes a first inner end configured to move relative to the at least one first side support. The green body carrier includes a flexible sheet attached to and suspended from the first inner end of the at least one first moveable support. The first inner end of the at least one first moveable support is configured to move inward to wrap the flexible sheet around at least a portion of the green body.

In certain embodiments, the green body carrier further includes at least one second moveable support mounted to the at least one second side support. Each of the at least one second moveable supports includes a second inner end configured to move relative to the at least one second side support. The flexible sheet is attached to and suspended from the second inner end of the at least one second moveable support. The second inner end of the at least one second moveable support is configured to move inward to wrap the flexible sheet around at least a portion of the green body.

In certain embodiments, the green body carrier is configured to wrap the flexible sheet around at least 180° of the green body. In certain embodiments, the green body carrier is configured to wrap the flexible sheet around at least 200° of the green body. In certain embodiments, the green body carrier is configured to wrap the flexible sheet around at least 300° of the green body.

In certain embodiments, the flexible sheet includes at least one of radiation coupling material or radiation blocking material. In certain embodiments, the radiation coupling material is configured to couple with microwave radiation. In certain embodiments, the radiation blocking material is configured to block microwave radiation. In certain embodiments, the radiation coupling material or radiation blocking material is embedded within the flexible sheet. In certain embodiments, the radiation coupling material or radiation blocking material includes radiation coupling panels or radiation blocking panels attached to an external surface of the flexible sheet. In certain embodiments, the radiation coupling panels or radiation blocking panels are positioned across a width of the flexible sheet to cover at least a portion of a circumference of the green body.

In certain embodiments, the at least one first side support includes a plurality of side supports, and the at least one first moveable support includes a plurality of first moveable supports. In certain embodiments, the first inner end of the at least one first moveable support comprises a first spool with at least a portion of the flexible membrane wrapped around the first spool. In certain embodiments, the green body carrier includes a first spool with at least a portion of the flexible membrane wrapped around the first spool. The at least one first moveable support includes a plurality of first moveable supports. Each first inner end of the plurality of first moveable supports is attached to a portion of the first spool. In certain embodiments, the at least one first moveable support includes a telescoping moveable support. In certain embodiments, the at least one first moveable support includes a toothed rack engaged with and driven by a pinion gear.

In certain embodiments, the green body carrier includes at least one first articulation motor coupled with the at least one first moveable support and is configured to move the first inner end between an extended position and a retracted position. In certain embodiments, the green body carrier includes at least one first spool motor coupled with a first spool having at least a portion of the flexible membrane wrapped around the first spool. The at least one first moveable support includes a plurality of first moveable supports. Each first inner end of the plurality of first moveable supports is attached to a portion of the first spool.

In certain embodiments, the green body carrier includes a first spool with at least a portion of the flexible membrane wrapped around the first spool and a second spool with at least a portion of the flexible membrane wrapped around the second spool. The at least one first moveable support includes a frontward first moveable support and a rearward first moveable support. Each first inner end of the frontward first moveable support and the rearward first moveable support are attached to a portion of the first spool. The at least one second moveable support includes a frontward second moveable support and a rearward second moveable support. Each second inner end of the frontward second moveable support and the rearward second moveable support attached to a portion of the second spool. The flexible sheet includes radiation coupling material or radiation blocking material. In certain embodiments, the green body carrier includes at least one first articulation motor coupled with the frontward first moveable support and the rearward first moveable support. Each of the at least one first articulation motors is configured to move the first inner end of each of the frontward first moveable support and the rearward first moveable support between an extended position and a retracted position. The green body carrier includes at least one second articulation motor coupled with the frontward second moveable support and the rearward second moveable support. Each of the at least one second articulation motors is configured to move the second inner end of each of the frontward second moveable support and the rearward second moveable support between an extended position and a retracted position. The green body carrier includes at least one first spool motor coupled with a first spool having at least a portion of the flexible membrane wrapped around the first spool. The green body carrier includes at least one second spool motor coupled with a second spool having at least a portion of the flexible membrane wrapped around the second spool.

In another aspect, a method of handling a green body includes placing a green body onto a flexible sheet attached to and suspended from the first inner end of at least one first moveable support. The at least one first moveable support is mounted to at least one first side support. The method further includes moving the first inner end of the at least one first moveable support relative to the at least one first side support to wrap the flexible sheet around at least a portion of the green body.

In certain embodiments, the flexible sheet is attached to and suspended from each second inner end of at least one second moveable support. The at least one second moveable support is mounted to at least one second side support. The method further includes moving each second inner end of at least one second moveable support relative to the at least one second side support inward to wrap the flexible sheet around at least a portion of the green body.

In certain embodiments, the flexible sheet includes radiation coupling material or radiation blocking material wrapped around a circumference of the green body. In certain embodiments, the method further includes rotating a first spool at the first inner end of the at least one first moveable support to adjust a length of the flexible sheet wrapped around the green body. In certain embodiments, the method further includes operating at least one first articulation motor to move the first inner end of the at least one first moveable support between an extended and a retracted position. The method further includes operating at least one first spool motor to rotate a first spool at the first inner end of the at least one first moveable support to adjust a length of the flexible sheet wrapped around the green body.

In certain embodiments, a method of manufacturing ceramic articles includes shaping a ceramic-forming material into one or more green bodies and handling the green bodies in accordance with the method described above. In certain embodiments, the shaping comprises an extrusion process.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary and are intended to provide an overview or framework to understanding the nature and character of the claims. The accompanying drawings are included to provide a further understanding and are incorporated in and constitute a part of this specification. The drawings illustrate one or more embodiment(s), and together with the description, serve to explain principles and operation of the various embodiments.

DETAILED DESCRIPTION

Figure 1A:
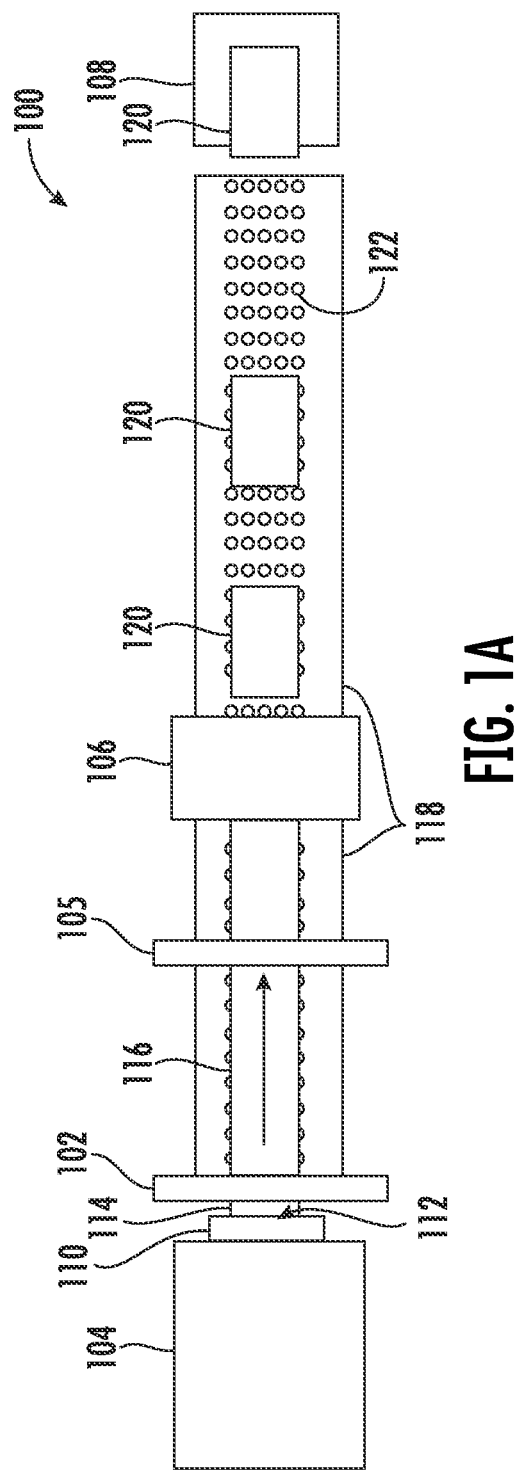
FIG. 1A is a schematic top plan view of an extrusion system including an infrared emitting device according to one embodiment of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure. As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The currently disclosed embodiments relate to methods and apparatuses for handling green ceramic material, such as in the manufacture of ceramic honeycomb bodies. For example, the methods and apparatuses herein advantageously prevent damage or deformation to ceramic green bodies during handling, enable the manufacture of higher quality and/or more dimensionally accurate ceramic products, and reduce the need for additional manufacturing steps to mitigate or correct damage or other quality issues. The currently disclosed embodiments may be particularly advantageous when manufacturing ceramic articles having large diameters, thin walls, and/or large open frontal areas, as these features may increase the likelihood of mechanical deformation during post-extrusion handling (e.g., by slump, deformation, or collapse). Such mechanical deformation may lead to decreased quality in fired products and/or production losses. For example, slump or other deformation of wet green material during manufacturing may compromise the shape of the fired product, which in turn may impact product parameters, such as isostatic strength or dimensional accuracy. Accordingly, it may be advantageous to maintain the shape of the wet green material upon leaving an extrusion die through production into a fired product.

FIG. 1A is a schematic top plan view of a manufacturing system 100 having an assembly for shaping a ceramic-forming mixture into green bodies. In the illustrated embodiment, the manufacturing system 100 comprises extrusion apparatus 104 (which may also be referred to herein as an extruder), such that the green bodies are shaped via extrusion. The manufacturing system 100 also includes a cutting assembly 106 (which may also be referred to herein as a wet saw or wet saw assembly), and a support channel 118 arranged as part of a conveyor apparatus (e.g., including an air bearing surface enabling a green body to be translated to a dryer tray 108 for subsequent transport to a kiln or other bulk drying apparatus) to produce a fired product (e.g., aluminum titanate, cordierite, other silica compositions, etc.). The extrusion apparatus 104 has an extrusion die 110, including an outlet 112 and is configured to continuously form wet extrudate material 114. Although an extrusion apparatus 104 is shown, it is noted that other systems may be used.

In certain embodiments, the manufacturing system 100 includes an infrared emitting device 102 positioned downstream of the outlet 112 in a direction of travel of the wet extrudate material 114. In other embodiments, a heater air blower, microwave device, and/or radiofrequency (RF) may be used. The extrusion apparatus 104 is a horizontal extruder that horizontally extrudes the wet extrudate material 114. In certain embodiments, the wet extrudate material 114 comprises a wet ceramic-forming mixture, which may include constituents such as aluminum titanate, mullite, talc, alumina, silica, clays, aluminum hydroxide, or any other suitable ceramic-precursor material. For example, the extrudate material 114 can be formed by forming a ceramic-forming mixture, or batch mixture, in a body or barrel of the extrusion apparatus 104 and then extruding the batch mixture through the extrusion die 110. In addition to the ceramic-precursors, the batch mixture can comprise one or more binders (e.g., organic binders such as methylcellulose) that assist in maintaining shape of the green bodies and/or impart green strength, pore formers (e.g., starch, graphite, or resins) that increase a porosity of the ceramic material that results from firing, a liquid vehicle (e.g., water) that assists in enabling the batch mixture to be mixed, shaped, and extruded, sintering aids (e.g., rare earth oxides) to assist in sintering of ceramic materials during firing, and lubricants (e.g., oil) to assist in reducing extrusion pressure, as well as any other additives or components helpful in the creation, shaping, processing, and/or properties of the extrudate, green bodies, and/or fired ceramic articles A support channel 118 arranged as part of a conveyor apparatus is configured to receive the wet extrudate material 114. In certain embodiments, the support channel 118 may have a partial circular, ovular, or rectangular cross-section to guide the wet extrudate material 114.

In certain embodiments, the manufacturing system 100 includes at least one sensor 105 positioned between the infrared emitting device 102 and the cutting assembly 106 to measure the moisture content of the wet extrudate material 114. In other embodiments, the at least one sensor 105 may include at least one positioned between the outlet 112 of the extrusion die 110 and the infrared emitting device 102 to measure a characteristic (e.g., moisture content) of the wet extrudate material 114. In other words, the at least one sensor 105 may be positioned upstream and/or downstream of the at least one infrared emitting device 102 in a direction of travel of the wet extrudate material 114. As the infrared emitting device 102 dries a circumferential portion of the wet extrudate material 114, the at least one sensor 105 provides feedback (e.g., real-time feedback) as to whether the wet extrudate material 114 are within acceptable specifications, particularly as to moisture content (e.g., to prevent overdrying) and especially for sensitive applications with narrow product specifications. In certain embodiments, a controller may be in electronic communication with the at least one sensor 105 and configured to adjust operating parameters of the infrared emitting device 102 (e.g., irradiation intensity), the extrusion apparatus 104 (e.g., the feed rate of the wet extrudate material 114), and/or an optional humidifier apparatus (not shown) to at least partially rehydrate the wet extrudate material 114.

In certain embodiments, the at least one sensor 105 includes an optical sensor configured to sense a reflectance property (e.g., reflectance of electromagnetic radiation), an absorbance property (e.g., absorbance of electromagnetic radiation), and/or a temperature of the exterior surface of the wet extrudate material 114. In certain embodiments, the at least one sensor 105 includes at least one radio frequency sensor configured to quantify moisture content in one or more portions of the wet extrudate material 114.

The cutting assembly 106 cuts a portion from the wet extrudate material 114 to form a green body 120 (which may also be referred to herein as a wet extrudate, wet log, etc.). In other words, the wet extrudate material 114 is extruded through the infrared emitting device 102, which is then translated by the extrudate support channel 118 to the cutting assembly 106, which cuts the wet extrudate material 114 to form multiple green bodies 120. It is noted that the green body 120 may be formed by other methods in addition to extrusion.

Once cut, a green body 120 is translated by the support channel 118 (as part of a conveyor apparatus) to the dryer tray 108. The support channel 118 may include an air-bearing surface 122, over which the green body 120 translates to promote low-friction movement of the green body 120.

Figure 1B:
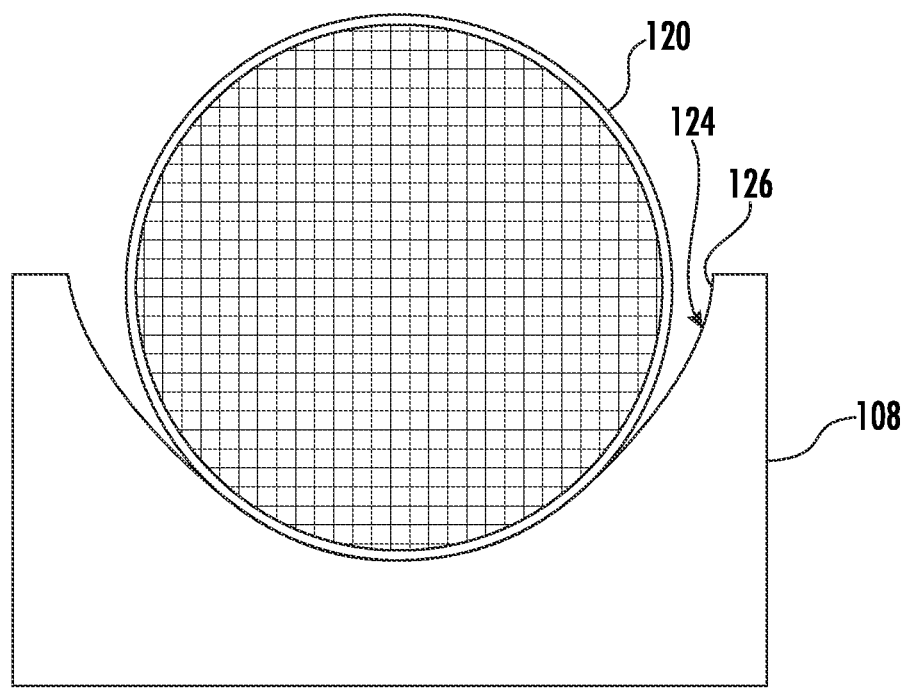
FIG. 1B is a side cross-sectional view of a green body formed from the extrusion system of FIG. 1A and supported by a dryer tray of a first configuration.
Figure 1C:
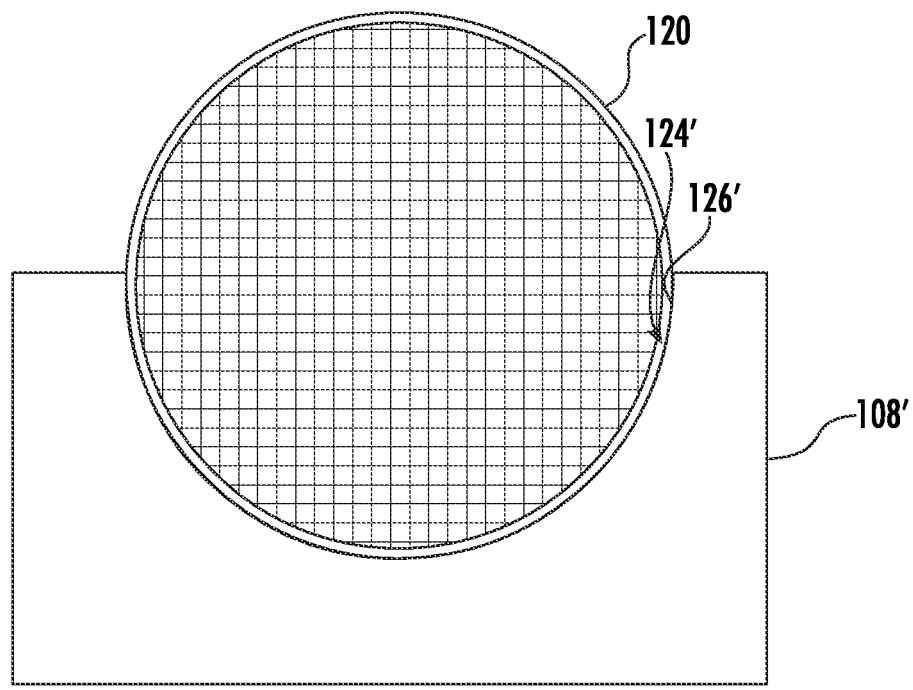
FIG. 1C is a side cross-sectional view of a green body formed from the extrusion system of FIG. 1A and supported by a dryer tray of a second configuration.

FIG. 1B is a side cross-sectional view of a green body 120 formed from the extrusion system of FIG. 1A and supported by a dryer tray 108 according to one configuration. The dryer tray 108 defines a recess 124 for receiving the green body 120. The upper lip 126 tapers wide such that the dryer tray 108 only supports a lower third of the green body 120. FIG. 1C is a side cross-sectional view of a green body 120 formed from the extrusion system of FIG. 1A and supported by a dryer tray 108' according to another configuration. The dryer tray 108' defines a recess 124' for receiving the green body 120. The upper lip 126' tapers narrower such that the dryer tray 108' supports a lower half (more than a third) of the green body 120. Supporting more of the green body 120 may reduce (e.g., eliminate) defects, such as from slumping. However, the rigid dryer tray 108' is generally limited to supporting a lower half of the green body 120. In other words, the dryer tray 108' is limited to supporting a lower 180° of the green body 120.

Figure 2A:
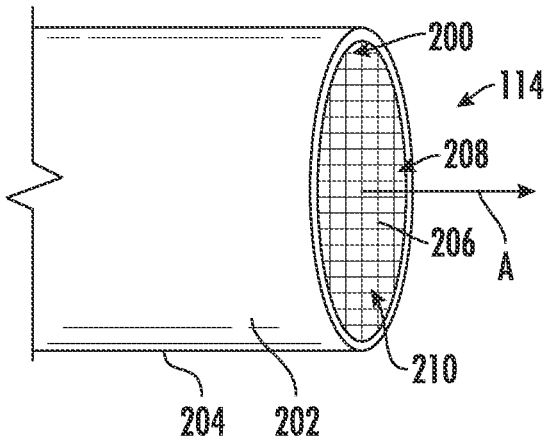
FIG. 2A is a perspective view of a green body formed from the extrusion system of FIG. 1A.
Figure 2B:
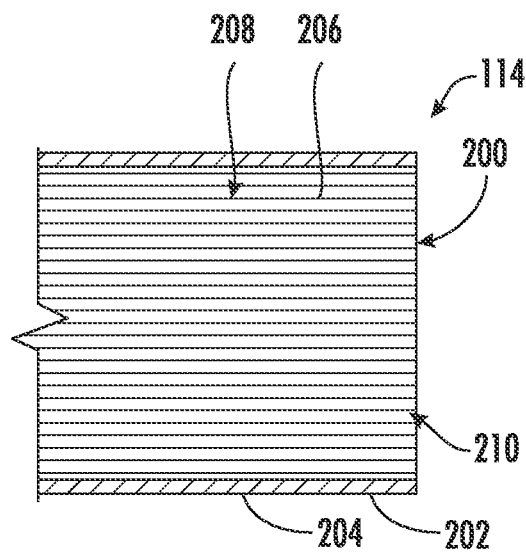
FIG. 2B is a side cross-sectional view of the green body of FIG. 2A.
Figure 2C:
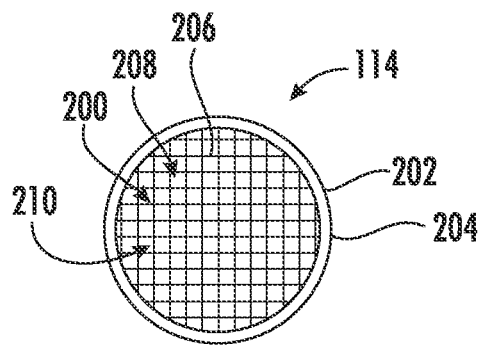
FIG. 2C is an end elevational view of the green body of FIG. 2A.

FIGS. 2A-2C depict wet extrudate material 114 formed from the extrusion system of FIG. 1. It is to be noted that the green body 120 has similar configurations and features. The wet extrudate material 114 has a first end 200 (e.g., front end), as well as a peripheral wall 202 having an external surface 204 (i.e., skin or outer surface, etc.) and a plurality of intersecting walls 206 within the peripheral wall 202. The intersecting walls 206 form mutually adjoining cell channels 208 extending axially in direction "A" from the first end 200. In certain embodiments, the wet extrudate material 114 has a honeycomb cross-section 210. The wet extrudate material 114 may have a diameter of any size, including comparatively large sizes (e.g., diameters of 4 inches (101.6 mm), 6 inches (152.8 mm), or greater).

Figure 3A:
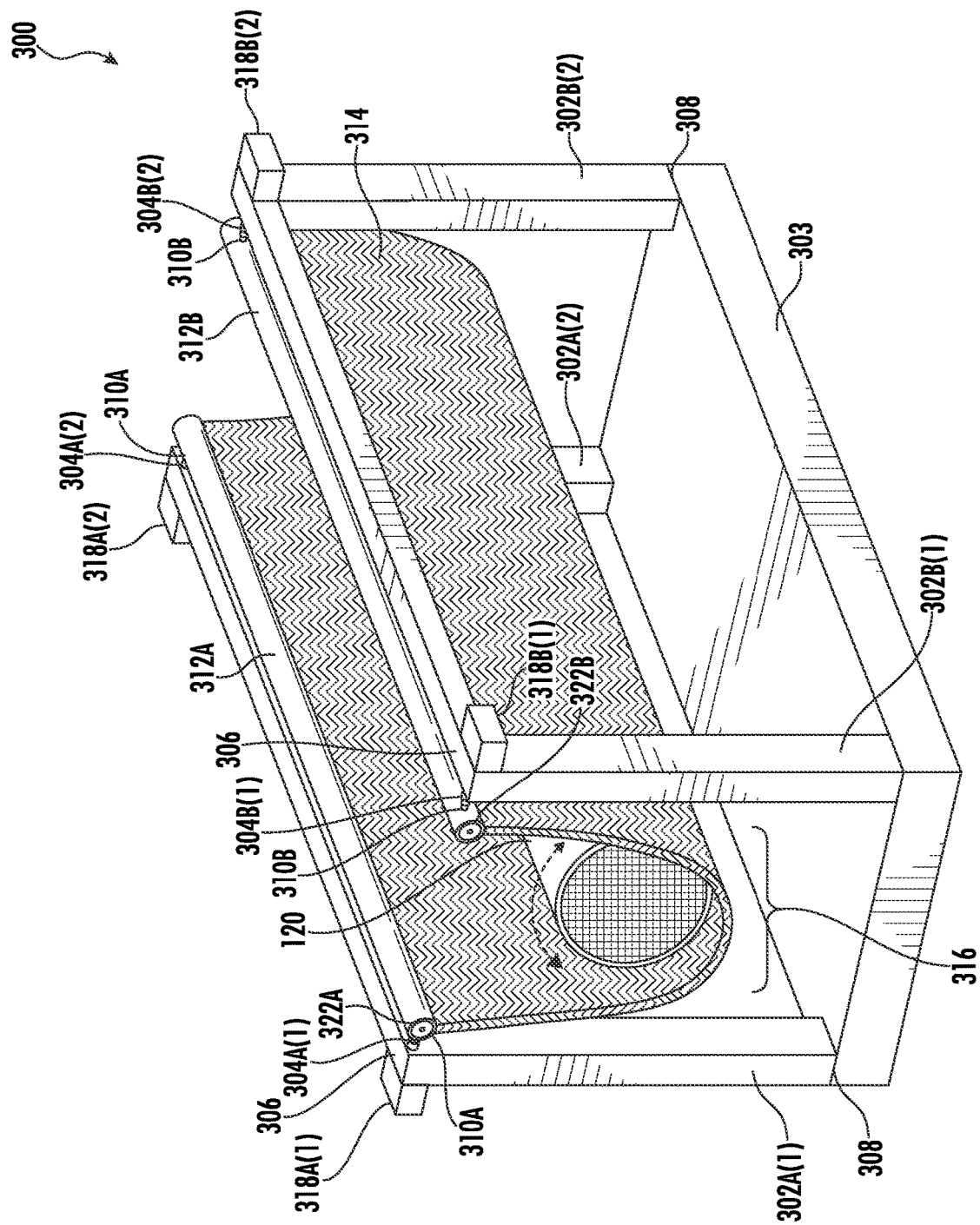
FIG. 3A is a perspective view of a green body carrier with moveable supports to wrap a flexible sheet around a green body.
Figure 3B:
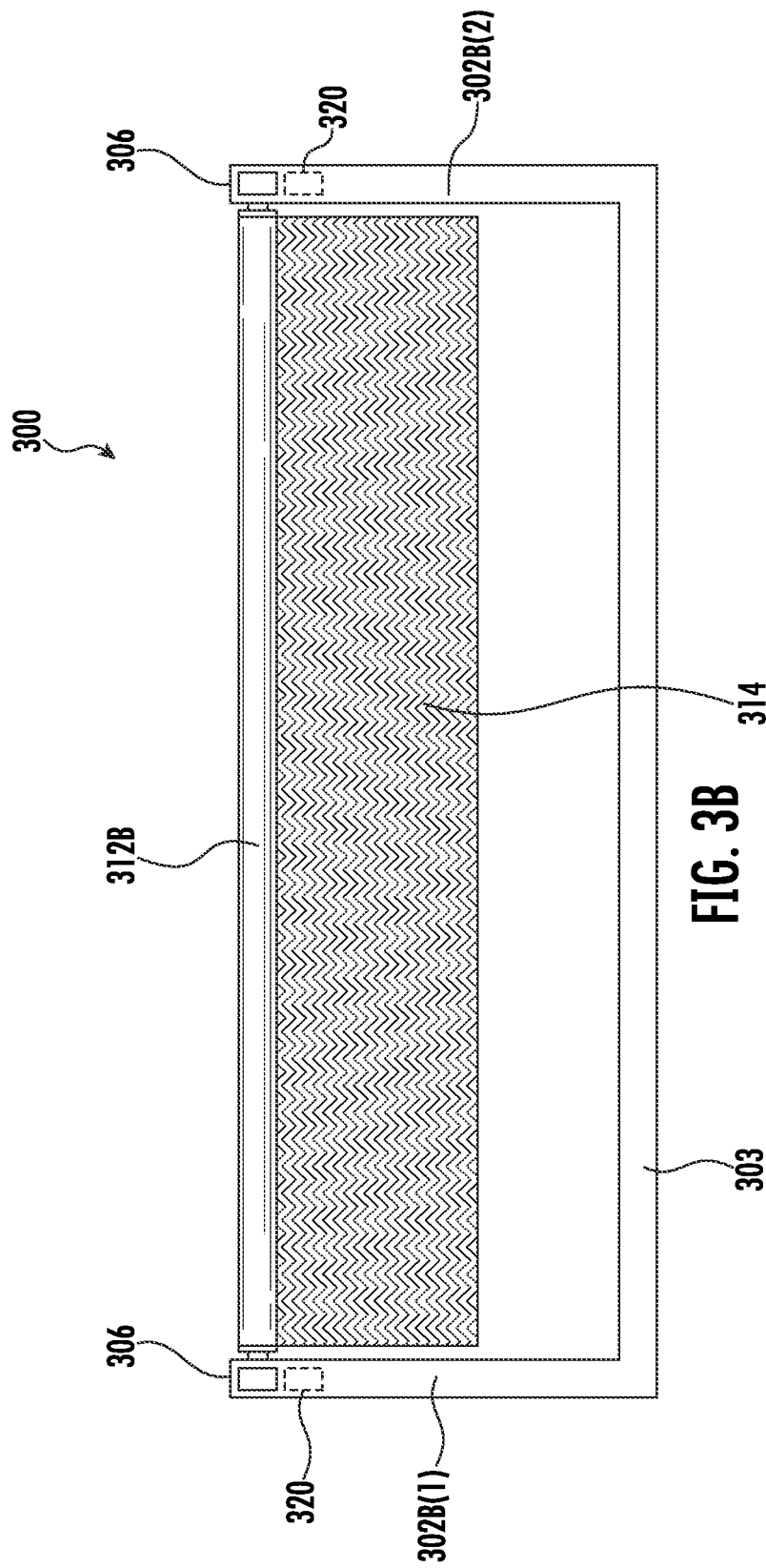
FIG. 3B is a side elevational view of the wrapped green body carrier of FIG. 3A.

FIGS. 3A-3B are views of a green body carrier 300 for a green body 120. The green body carrier 300 includes two left side supports 302A(1)-302A(2) (which may be referred to as a first side support) and two right side supports 302B(1)-302B(2) (which may be referred to as a second side support) opposite thereto, although more or fewer side supports 302A(1)-302B(2) may be used. The left side supports 302A(1)-302A(2) (referred to generally as left side supports 302A) include a left frontward side support 302A(1) and a left rearward side support 302A(2). The right side supports 302B(1)-302B(2) (referred to generally as right side supports 302B) include a right frontward side support 302B(1) and a right rearward side support 302B(2). Each of the side supports 302A, 302B includes a top end 306 and a bottom end 308. The side supports 302A, 302B are positioned in a generally rectangular shape. In certain embodiments, the side supports 302A, 302B are attached to and upwardly extend from a tray base 303. In certain embodiments, the tray base 303 is configured to be disposed on a conveyor (e.g., air bearing, conveyor belt, etc.) to transport the carrier green body carrier 300. In certain embodiments, a height of the side supports 302A, 302B is adjustable. In certain embodiments, a relative position of the side supports 302A, 302B is adjustable.

The green body carrier 300 includes left moveable supports 304A(1)-304A(2) (which may be referred to as a first moveable support, first arm, etc.) mounted (respectively) to the left side supports 302A, and right moveable supports 304B(1)-304B(2) (which may be referred to as a second moveable support, second arm, etc.) mounted (respectively) to the right side supports 302B. Each of the left moveable supports 304A(1)-304A(2) (which may be referred to generally as left moveable supports 304A), and the right moveable supports 304B(1)-304B(2) (which may be referred to generally as left moveable supports 304B) are positioned toward a top end 306 of the side supports 302A, 302B. It is noted that in certain embodiments, either left moveable supports 304A(1)-304A(2) or right moveable supports 304B(1)-304B(2) may be used.

Each of the left moveable supports 304A includes a left inner end 310A (which may be referred to as a first inner end), and each of the right moveable supports 304B includes a right inner end 310B (which may be referred to as a second inner end). The left inner end 310A of the left moveable support 304A is configured to move relative to the left side support 302A. Similarly, the right inner end 310B of the right moveable support 304B is configured to move relative to the right side support 302B. In this way, the left inner end 310A of the left moveable support 304A and the right inner end 310B of the right moveable support 304B move toward or away from each other.

The green body carrier 300 includes a left spool 312A rotatably attached to the left inner end 310A of the left moveable supports 304A, and a right spool 312B rotatably attached to the right inner end 310B of the right moveable support 304B. In other words, in certain embodiments, a plurality of moveable supports 304A, 304B, which include an inner end 310A, 310B attached to a portion of a spool 312A, 312B.

The green body carrier 300 further includes a flexible sheet 314 (which may also be referred to as a membrane) with a portion of the flexible sheet 314 wrapped around the left spool 312A, a portion of the flexible sheet 314 wrapped around the right spool 312B, and a support portion 316 suspended therebetween. The support portion 316 is configured to support a green body 120 thereon. In certain embodiments, the flexible sheet 314 comprises a permeable elastic membrane (e.g., permeable to water vapor). The permeability of the flexible sheet 314 to water vapor allows water vapor to escape a perimeter of the green body 120, preventing water from being trapped along the flexible sheet 314. The elasticity of the flexible sheet 314 allows the flexible sheet 314 to conform to the size and/or shape of the green body 120.

In certain embodiments, the flexible sheet 314 comprises at least one of radiation coupling material (configured to couple with microwave radiation) or radiation blocking material (configured to block microwave radiation). Such material spreads radiation for a more even distribution onto the green body 120, thereby reducing (or eliminating) potential defects. In certain embodiments, the radiation coupling material or radiation blocking material is embedded within the flexible sheet 314. In certain embodiments, the radiation coupling material or radiation blocking material comprises radiation coupling panels or radiation blocking panels attached to an external surface of the flexible sheet 314. In certain embodiments, the radiation coupling panels or radiation blocking panels are positioned across a width of the flexible sheet 314 to cover at least a portion of a circumference of the green body 120.

The flexible sheet 314 is attached to and suspended from each inner end 310A, 310B of the moveable supports 304A, 304B (forming a sling). Translation and/or rotation of the spools 312A, 312B wraps or unwraps the flexible sheet 314 to adjust a length of the flexible sheet 314 suspended between the left spool 312A and the right spool 312B. Winding and unwinding of two spools 312A, 312B allows wrapping or unwrapping the flexible sheet 314 without adjusting a center of the flexible sheet 314. This may be advantageous to make adjustments of a green body 120 loaded onto the flexible sheet 314 without rotating the green body 120. However, it is noted that in certain embodiments, just one of the left spool 312A or the right spool 312B is used.

When the green body 120 is disposed in the support portion 316 of the flexible sheet 314, the flexible sheet 314 conforms to and accommodates different sizes of green bodies 120 (e.g., of different diameters). Further, the spools 312A, 312B rotate to adjust a height of the green body 120 from the tray base 303.

In certain embodiments, the green body carrier 300 includes one or more articulation motors 318A(1)-318B(2) (which may be referred to as articulation motors 318A, 318B) and/or gear wheels 320 attached to or positioned within the side supports 302A, 302B for adjusting the moveable supports 304A, 304B relative to the side supports 302A, 302B. In certain embodiments, fewer articulation motors 318A, 318B could be used such that a left articulation motor 318A controls the left moveable supports 304A between an extended position and a retracted position, and a right articulation motor 318B controls the right moveable supports 304B between an extended position and a retracted position. In certain embodiments, a left spool motor 322A is coupled with the left spool 312A to wrap or unwrap the flexible sheet 314 about the left spool 312A, and a right spool motor 322B is coupled with the right spool 312B to wrap or unwrap the flexible sheet 314 about the right spool 312B. In certain embodiments, the articulation motors 318A, 318B, and/or spool motors 322A, 322B are external and/or internal to the side supports 302A, 302B.

FIGS. 4A-4F are views of a green body carrier of FIGS. 3A-3B illustrating movement of the moveable supports 304A, 304B from an open position to a closed position. A green body 120 is positioned in the flexible sheet 314 with a portion of the flexible sheet 314 wrapped around the left spool 312A and the right spool 312B. The left inner end 310A of the left moveable support 304A and the right inner end 310B of the right moveable support 304B are configured to move inward to wrap the flexible sheet 314 around at least a portion of the green body 120.

Figure 4A:
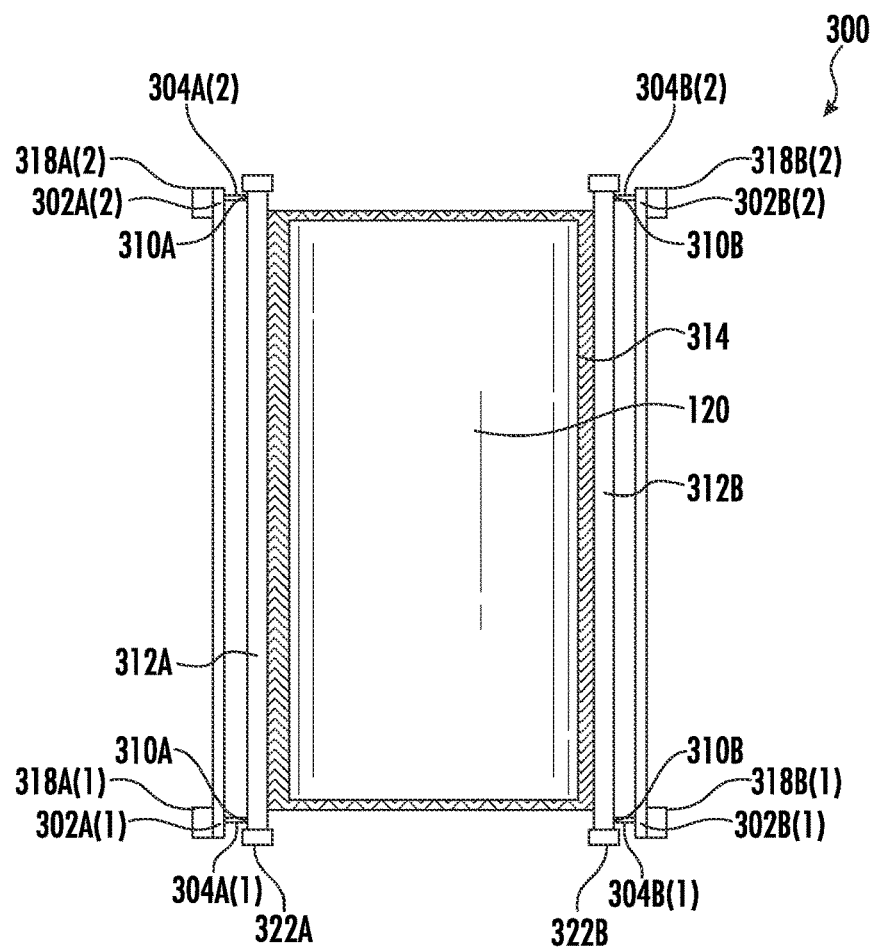
FIG. 4A is a top plan view of the green body carrier of FIGS. 3A-3B with moveable supports in an open position and the green body on a flexible sheet of the green body carrier.
Figure 4B:
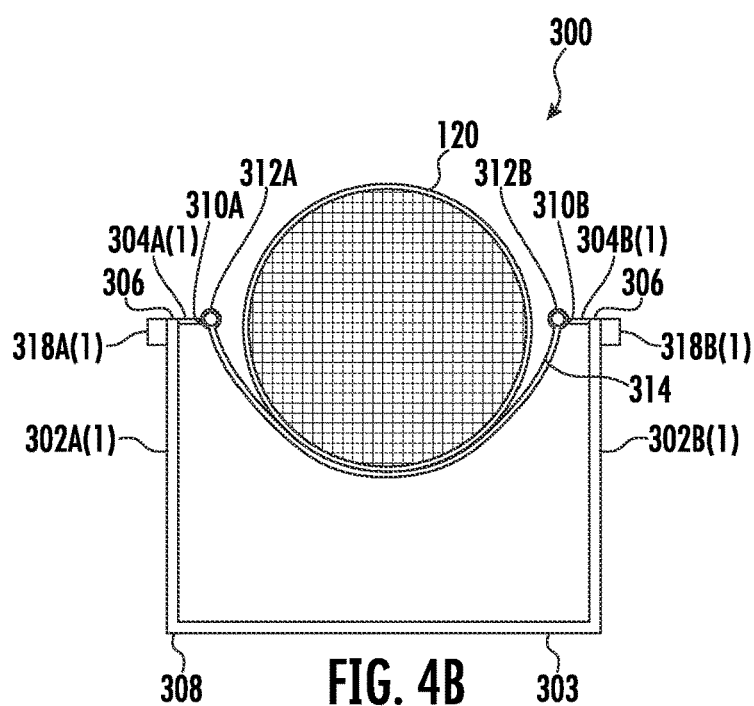
FIG. 4B is a front elevational view of the green body carrier of FIG. 4A with moveable supports in the open position.

In FIGS. 4A and 4B, the flexible sheet 314 is unwrapped to a first length (between the left spool 312A and the right spool 312B). Further, the inner ends 310A, 310B of the moveable supports 304A, 304B are at an open position. Accordingly, the inner ends 310A, 310B of the moveable supports 304A, 304B are at a position greater than a diameter of the green body 120.

Figure 4C:
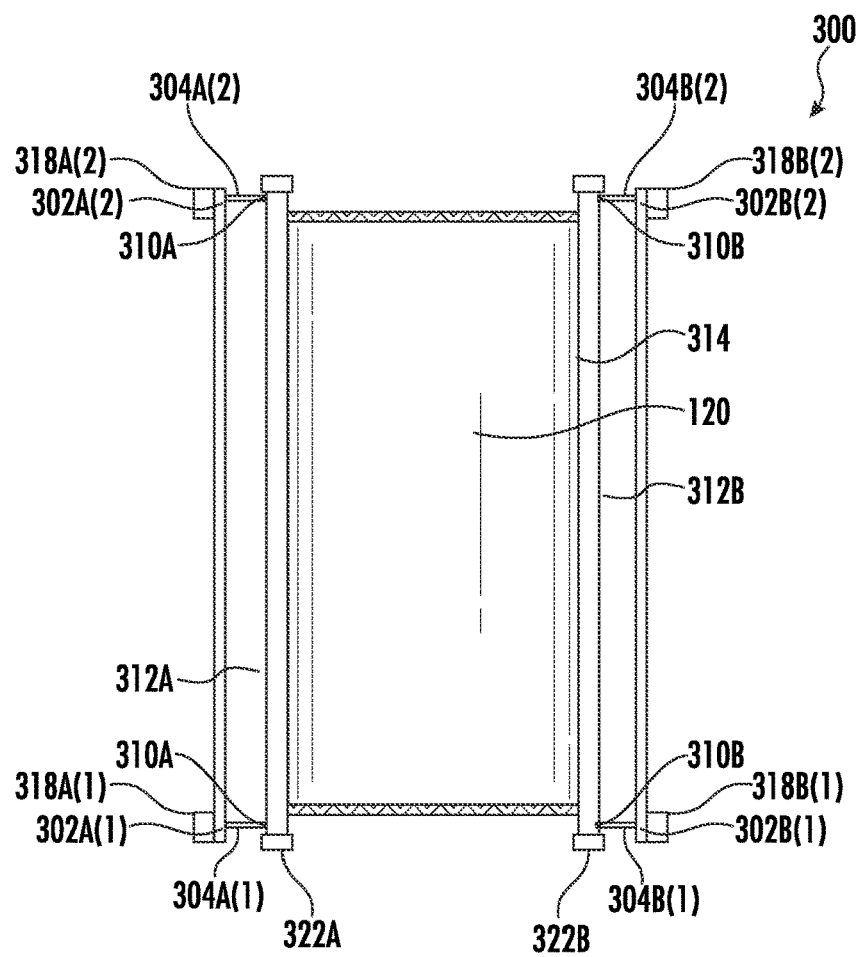
FIG. 4C is a top plan view of the green body carrier of FIG. 4A with moveable supports in an intermediate position.
Figure 4D:
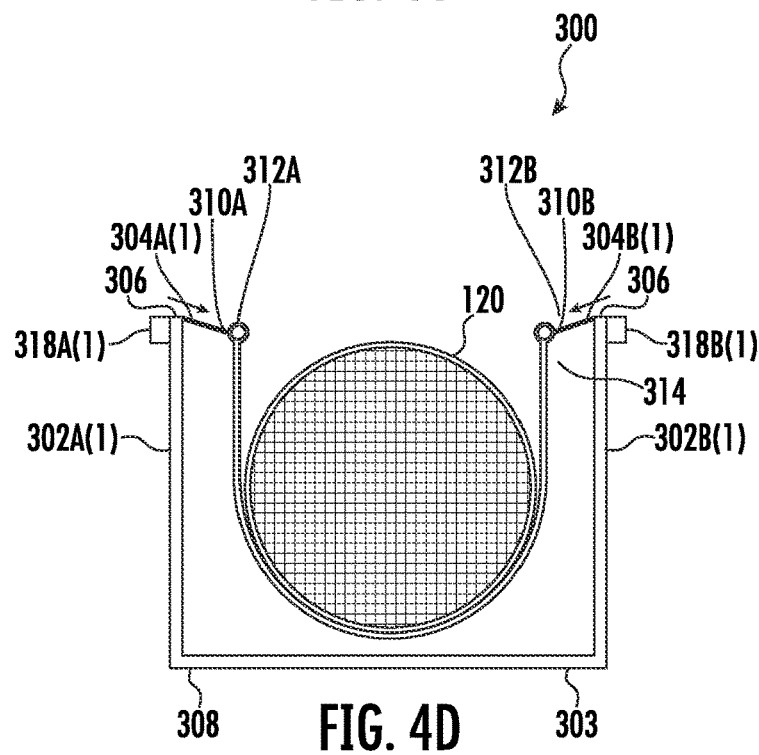
FIG. 4D is a front elevational view of the green body carrier of FIG. 4C with moveable supports in the intermediate position.

In FIGS. 4C and 4D, the flexible sheet 314 is unwrapped to a second length (between the left spool 312A and the right spool 312B). Further, the inner ends 310A, 310B of the moveable supports 304A, 304B are at an intermediate position. Accordingly, the inner ends 310A, 310B of the moveable supports 304A, 304B are at a position about the same as the diameter of the green body 120. Further, a distance between the inner ends 310A, 310B of the moveable supports 304A, 304B is closer in the intermediate position than the open position.

Figure 4E:
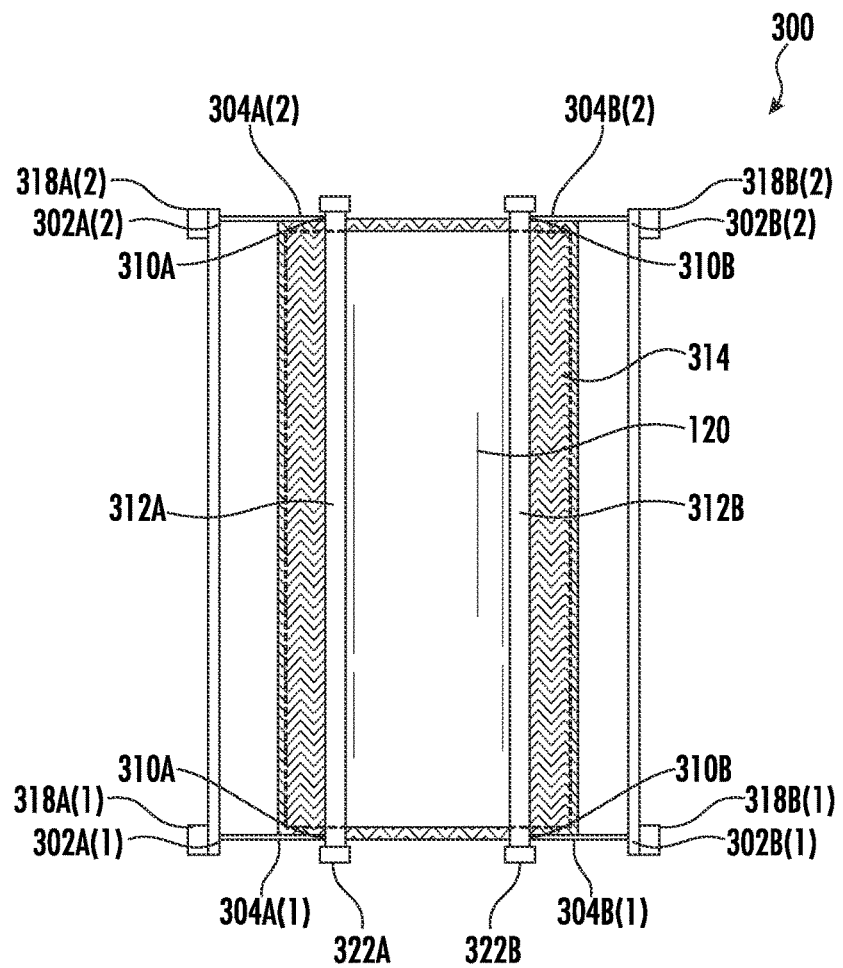
FIG. 4E is a top plan view of the green body carrier of FIG. 4A with moveable supports in a closed position.
Figure 4F:
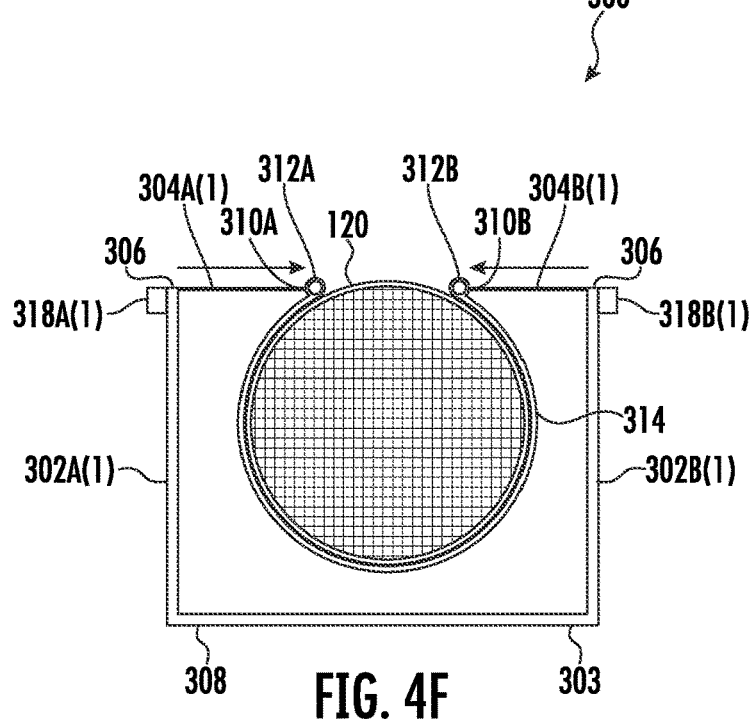
FIG. 4F is a front elevational view of the green body carrier of FIG. 4E with moveable supports in the closed position.

In FIGS. 4E and 4F, the flexible sheet 314 is unwrapped to a third length (between the left spool 312A and the right spool 312B). Further, the inner ends 310A, 310B of the moveable supports 304A, 304B are at a closed position. Accordingly, the inner ends 310A, 310B of the moveable supports 304A, 304B are at a position less than the diameter of the green body 120. Further, a distance between the inner ends 310A, 310B of the moveable supports 304A, 304B is closer in the closed position than the intermediate position and the open position.

In the closed position, the flexible sheet 314 is wrapped around the green body 120. The flexible sheet 314 may be wrapped around and conform to the shape of the green body 120. In certain embodiments, the flexible sheet 314 may be configured to encircle the green body 120 more than 180°. For example, in certain embodiments, the flexible sheet 314 encircles the green body 120 at least 200°, at least than 270°, at least 300°, at least 330°, at least 345°, at least 350°, at least 355°, at least 359°, or even 360°.

The moveable supports 304A, 304B and/or spools 312A, 312B can be adjusted during the drying process to adjust to shrinkage of the green body 120. In this way, the green body carrier 300 provides uniform and consistent support before and/or during the drying process. In particular, the green body carrier 300 conforms to the size and/or shape of the green body 120 to allow for log bow, maintain contact as the green body 120 shrinks, and/or accommodate green bodies 120 of different cross-sections (e.g., non-circular cross-sections). The green body carrier 300 improves the shape or quality of the green body 120 (e.g., Extrude to Shape (ETS) ware). Further, the green body carrier 300 reduces the need for other types of equipment, reduces cost, and/or reduces operational complexity. For example, the green body carrier 300 can be used for multiple sizes and/or types of cross-sections (e.g., round, oval, etc.). Because the green body carrier 300 is more sensitive and improves drying, softer green bodies 120 can be used, which increases the feed rate of the wet extrudate material 114. It is noted that the process also works in the reverse, from the closed position to the open position.

Figure 5:
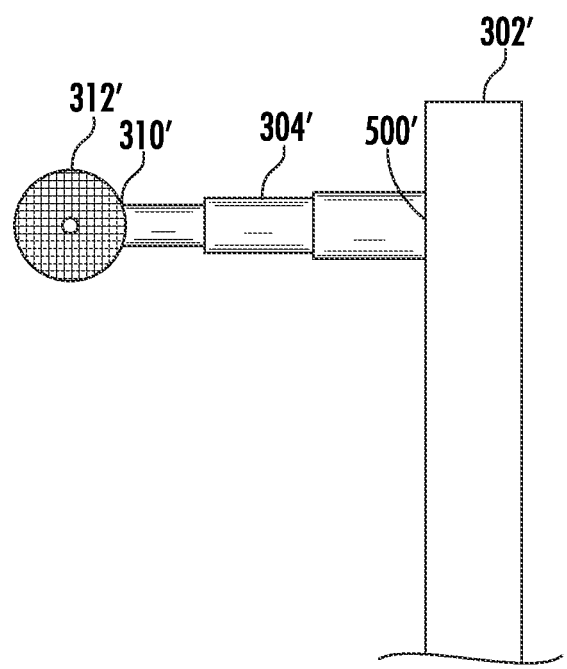
FIG. 5 is a side elevational view of a moveable support of the green body carrier of FIGS. 3A-3B embodied as a telescoping moveable support.

FIG. 5 is a side elevational view of a moveable support 304A, 304B of the green body carrier 300 of FIGS. 3A-3B embodied as a telescoping moveable support 304' (which may be referred to as a telescoping arm). The telescoping moveable support 304' includes an inner end 310' and an external end 500' opposite the inner end 310'. The external end 500' of the telescoping moveable support 304' is fixed to the side support 302'. As noted above, the telescoping moveable support 304' includes a spool 312' at the inner end 310'.

Figure 6:
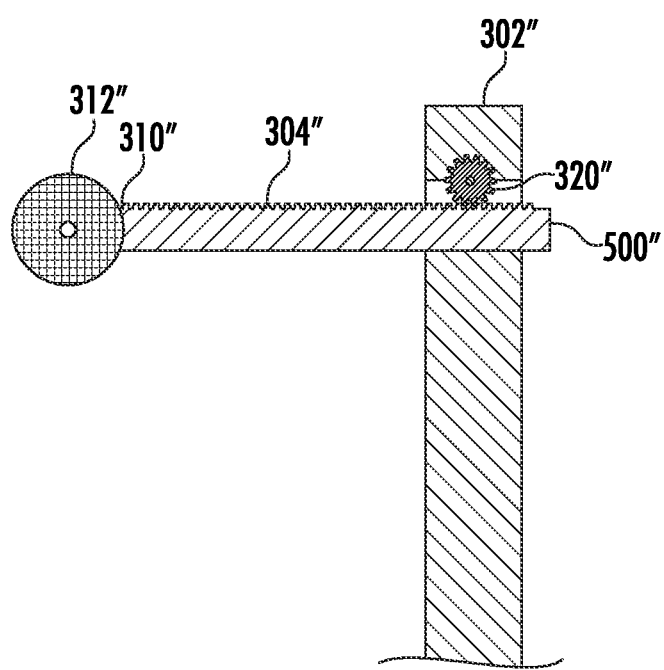
FIG. 6 is a side elevational view of a moveable support of the green body carrier of FIGS. 3A-3B embodied as a toothed rack.

FIG. 6 is a side elevational view of a moveable support 304A, 304B of the green body carrier of FIGS. 3A-3B embodied as a toothed rack 304". The toothed rack 304" includes an inner end 310" and an external end 500" opposite the inner end 310". As noted above, the toothed rack 304" includes a spool 312" at the inner end 310". The gear wheel is embodied as a pinion gear 320" (which may be referred to as a pinion wheel) engaged with the toothed rack 304". In particular, the toothed rack 304" is engaged with and driven by the pinion gear 320". As illustrated, the toothed rack 304" extends through the side support 302" with the inner end 310" on one side of the side support 302" and the external end 500" on the other side of the side support 302".

Figure 7A:
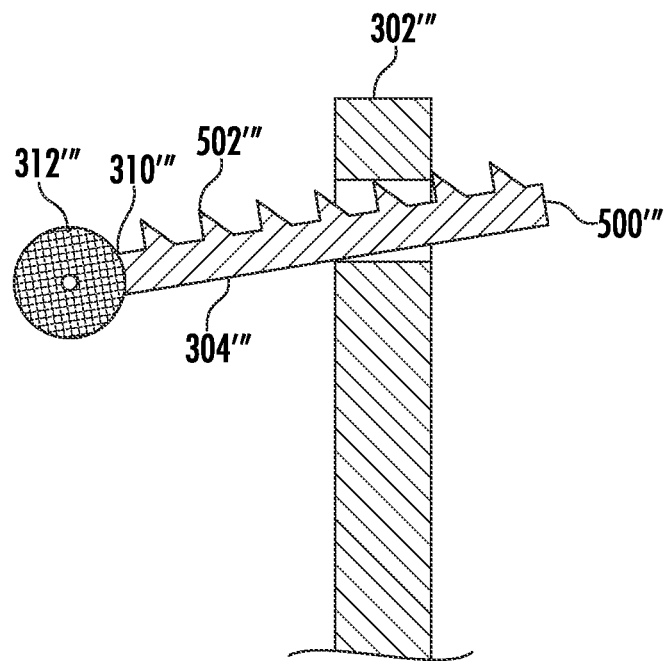
FIG. 7A is a side elevational view of a moveable support of the green body carrier of FIGS. 3A-3B embodied as a ratcheting arm.
Figure 7B:
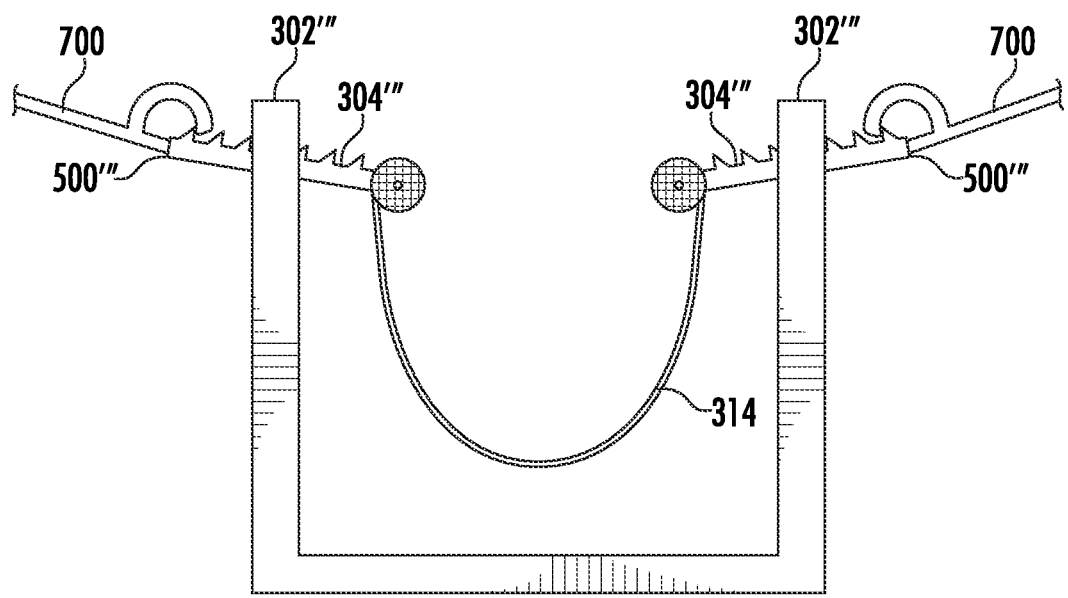
FIG. 7B is a side elevational view of the green body carrier with the ratcheting arms of FIG. 7A with adjustment tools to adjust positions of the ratcheting arms.
Figure 7C:
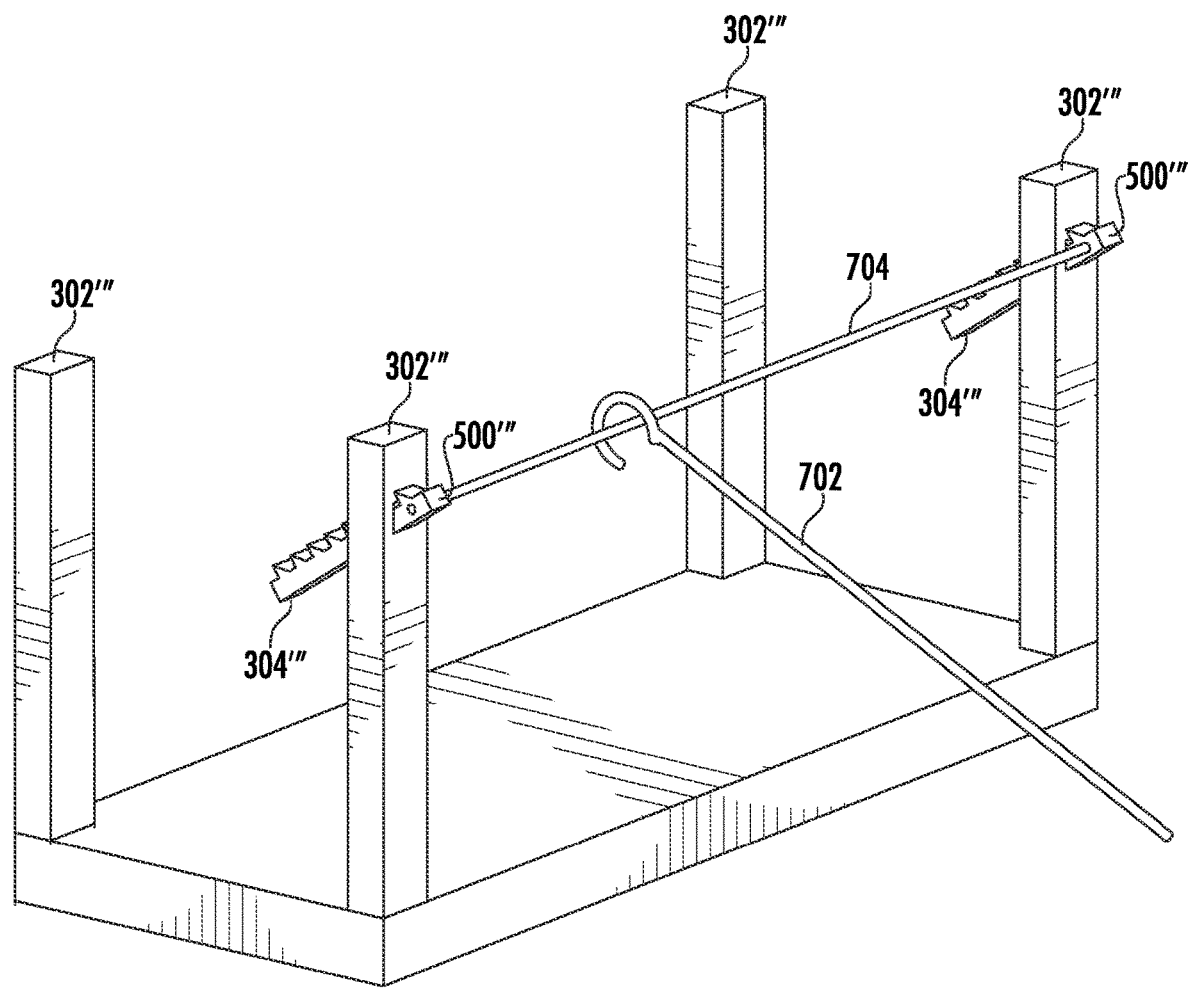
FIG. 7C is a perspective view of the green body carrier with the ratcheting arms of FIG. 7A with an adjustment tool to simultaneously adjust positions of ratcheting arms mechanically coupled to each other.

FIGS. 7A-7C are views of a moveable support 304A, 304B of the green body carrier 300 of FIGS. 3A-3B embodied as a ratcheting arm 304'''.

Referring to FIG. 7A, a moveable support 304A, 304B of the green body carrier 300 of FIGS. 3A-3B embodied as a ratcheting arm 304'''. The ratcheting arm 304''' includes an inner end 310''' and an external end 500''' opposite the inner end 310'''. As noted above, the ratcheting arm 304''' includes a spool 312''' at the inner end 310'''. As illustrated, the ratcheting arm 304''' extends through the side support 302''' with the inner end 310''' on one side of the side support 302''' and the external end 500''' on the other side of the side support 302'''. The ratcheting arm 304''' includes teeth 502''' that engages the side support 302''' and prevents the ratcheting arm 304''' from moving inward.

Referring to FIG. 7B, adjustment tools 700 are engaged with external ends 500''' of the ratcheting arms 304''' to adjust positions of the ratcheting arms 304''' relative to the side supports 302'''.

Referring to FIG. 7C, an adjustment tool 702 is engaged to a linkage 704 which extends between and couples external ends 500''' of the ratcheting arms 304''' to each other to simultaneously adjust positions of the ratcheting arms 304'''.

Figure 8:
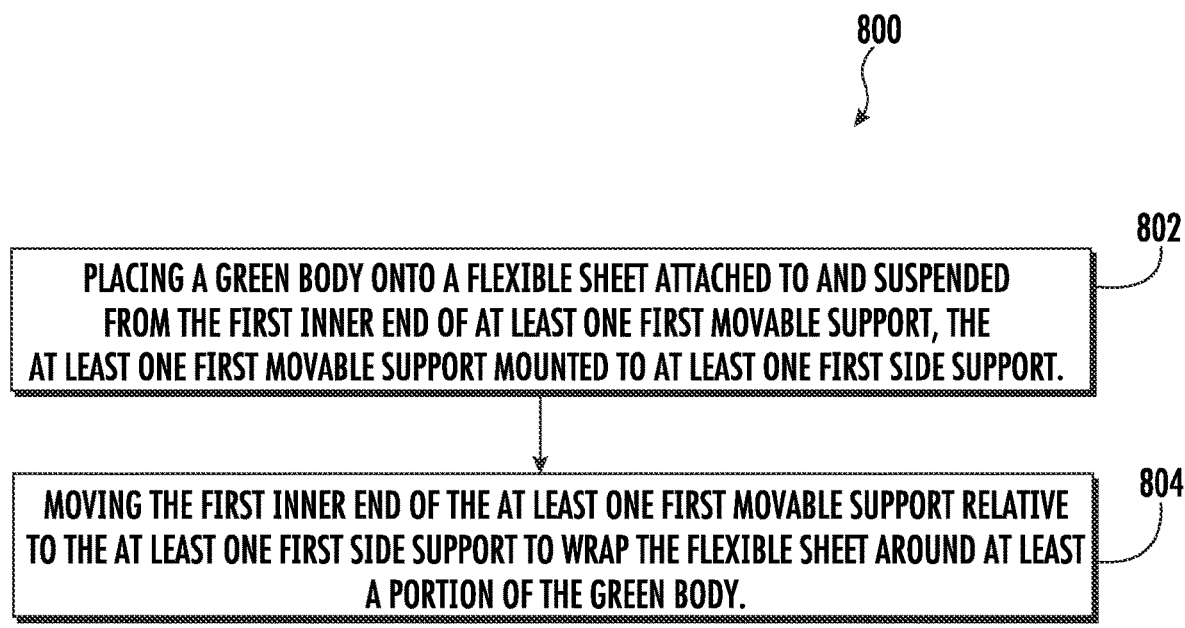
FIG. 8 is a flowchart identifying steps of a method for handling a green body.

FIG. 8 is a flowchart 800 identifying steps of a method of handling a green body. Step 802 includes placing a green body onto a flexible sheet attached to and suspended from the first inner end of at least one first moveable support. The at least one first moveable support is mounted to at least one first side support. Step 804 includes moving each first inner end of the at least one first moveable support relative to the at least one first side support to wrap the flexible sheet around at least a portion of the green body.

In certain embodiments, the green body carrier further includes at least one second moveable support mounted to the at least one second side support. Each of the at least one second moveable supports includes a second inner end configured to move relative to the at least one second side support. The flexible sheet is attached to and suspended from the second inner end of the at least one second moveable support. The second inner end of the at least one second moveable support is configured to move inward to wrap the flexible sheet around at least a portion of the green body.

In certain embodiments, the flexible sheet includes radiation coupling material or radiation blocking material wrapped around a circumference of the green body.

In certain embodiments, the method includes rotating a first spool at the first inner end of the at least one first moveable support to adjust a length of the flexible sheet wrapped around the green body.

In certain embodiments, the method includes operating at least one first articulation motor to move the first inner end of the at least one first moveable support between an extended and a retracted position. The method further includes operating at least one first spool motor to rotate a first spool at the first inner end of the at least one first moveable support to adjust a length of the flexible sheet wrapped around the green body.

In certain embodiments, a method of manufacturing ceramic articles includes shaping a ceramic-forming material into one or more green bodies and handling the green bodies in accordance with the method described above. In certain embodiments, the shaping comprises an extrusion process.

It will be apparent to those skilled in the art that various modifications and variations can be made without departing from the spirit or scope of the invention.

Many modifications and other embodiments of the embodiments set forth herein will come to mind to one skilled in the art to which the embodiments pertain, having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A green body carrier, comprising:
   at least one first side support;
   at least one second side support positioned opposite the at least one first side support;
   at least one first moveable support mounted to the at least one first side support, each of the at least one first moveable support comprising a first inner end configured to move relative to the at least one first side support;
   a flexible sheet attached to and suspended from the first inner end of the at least one first moveable support; and
   wherein the first inner end of the at least one first moveable support is configured to move inward to wrap the flexible sheet around at least a portion of a green body.

2. The green body carrier of claim 1, further comprising:
   at least one second moveable support mounted to the at least one second side support, each of the at least one second moveable support comprising a second inner end configured to move relative to the at least one second side support;
wherein the flexible sheet is attached to and suspended from the second inner end of the at least one second moveable support; and
wherein the second inner end of the at least one second moveable support is configured to move inward to wrap the flexible sheet around at least a portion of the green body.

3. The green body carrier of claim 1, wherein the green body carrier is configured to wrap the flexible sheet around at least 180° of the green body.

4. The green body carrier of claim 1, wherein the green body carrier is configured to wrap the flexible sheet around at least 200° of the green body.

5. The green body carrier of claim 1, wherein the green body carrier is configured to wrap the flexible sheet around at least 300° of the green body.

6. The green body carrier of claim 1, wherein the flexible sheet comprises at least one of radiation coupling material or radiation blocking material.

7. The green body carrier of claim 6, wherein the radiation coupling material or the radiation blocking material is embedded within the flexible sheet.

8. The green body carrier of claim 6, wherein the radiation coupling material or the radiation blocking material comprises radiation coupling panels or radiation blocking panels attached to an external surface of the flexible sheet.

9. The green body carrier of claim 8, wherein the radiation coupling panels or the radiation blocking panels are positioned across a width of the flexible sheet to cover at least a portion of a circumference of the green body.

10. The green body carrier of claim 1, wherein the first inner end of the at least one first moveable support comprises a first spool with at least a portion of the flexible sheet wrapped around the first spool.

11. The green body carrier of claim 1,
further comprising a first spool with at least a portion of the flexible sheet wrapped around the first spool; and
wherein the at least one first moveable support comprises a plurality of first moveable supports, each first inner end of the plurality of first moveable supports attached to a portion of the first spool.

12. The green body carrier of claim 1, wherein the at least one first moveable support comprises a telescoping moveable support.

13. The green body carrier of claim 1, wherein the at least one first moveable support comprises a toothed rack engaged with and driven by a pinion gear.

14. The green body carrier of claim 1, further comprising at least one first articulation motor coupled with the at least one first moveable support and configured to move the first inner end between an extended position and a retracted position.

15. The green body carrier of claim 1,
further comprising at least one first spool motor coupled with a first spool having at least a portion of the flexible sheet wrapped around the first spool; and
wherein the at least one first moveable support comprises a plurality of first moveable supports, each first inner end of the plurality of first moveable supports attached to a portion of the first spool.

16. The green body carrier of claim 1,
further comprising a first spool with at least a portion of the flexible sheet wrapped around the first spool, and a second spool with at least a portion of the flexible sheet wrapped around the second spool;
wherein the at least one first moveable support comprises a frontward first moveable support and a rearward first moveable support, each first inner end of the frontward first moveable support and the rearward first moveable support attached to a portion of the first spool;
wherein the at least one second moveable support comprises a frontward second moveable support and a rearward second moveable support, each second inner end of the frontward second moveable support and the rearward second moveable support attached to a portion of the second spool; and
wherein the flexible sheet comprises radiation coupling material or radiation blocking material.

17. The green body carrier of claim 16, further comprising:
at least one first articulation motor coupled with the frontward first moveable support and the rearward first moveable support, each of the at least one first articulation motor configured to move the first inner end of each of the frontward first moveable support and the rearward first moveable support between an extended position and a retracted position;
at least one second articulation motor coupled with the frontward second moveable support and the rearward second moveable support, each of the at least one second articulation motor configured to move the second inner end of each of the frontward second moveable support and the rearward second moveable support between an extended position and a retracted position;
at least one first spool motor coupled with a first spool having at least a portion of the flexible sheet wrapped around the first spool; and
at least one second spool motor coupled with a second spool having at least a portion of the flexible sheet wrapped around the second spool.

18. A method of handling a green body, comprising:
placing a green body onto a flexible sheet attached to and suspended from a first inner end of at least one first moveable support and a second inner end of at least one second moveable support, the at least one first moveable support mounted to at least one first side support and the at least one second moveable support mounted to at least one second side support; and
moving the first inner end of the at least one first moveable support relative to the at least one first side support and the second inner end of the at least one second moveable support relative to the at least one second side support inward to wrap the flexible sheet around at least a portion of the green body.

19. The method of claim 18, further comprising rotating a first spool at the first inner end of the at least one first moveable support to adjust a length of the flexible sheet wrapped around the green body.

* * * * *